US011276323B1

(12) United States Patent
Kirchner et al.

(10) Patent No.: US 11,276,323 B1
(45) Date of Patent: Mar. 15, 2022

(54) MODULAR BUILDING FIRE FIGHTING SIMULATOR

(71) Applicant: JAHNKE & SONS CONSTRUCTION, INC., Overland Park, KS (US)

(72) Inventors: Joseph Peter Kirchner, Kansas City, MO (US); Steven William Jahnke, Mission, KS (US)

(73) Assignee: Jahnke & Sons Construction, Inc., Overland Park, KS (US)

( * ) Notice: Subject to any disclaimer, the term of this patent is extended or adjusted under 35 U.S.C. 154(b) by 0 days.

(21) Appl. No.: 15/787,495

(22) Filed: Oct. 18, 2017

Related U.S. Application Data

(60) Provisional application No. 62/409,476, filed on Oct. 18, 2016.

(51) Int. Cl.
*G09B 9/00* (2006.01)
*E04B 1/343* (2006.01)
*E04H 1/12* (2006.01)
*E04B 1/24* (2006.01)
*A62C 99/00* (2010.01)
*E04B 1/348* (2006.01)
*E04H 1/00* (2006.01)

(52) U.S. Cl.
CPC ............ *G09B 9/00* (2013.01); *A62C 99/0081* (2013.01); *E04B 1/2403* (2013.01); *E04B 1/3483* (2013.01); *E04B 1/34331* (2013.01); *E04H 1/005* (2013.01); *E04H 1/1205* (2013.01); *E04B 2001/34892* (2013.01); *E04H 2001/1283* (2013.01)

(58) Field of Classification Search
CPC ......... G09B 9/00; E04H 1/005; E04H 1/1205; E04H 2001/1283; E04B 1/3483; E04B 1/34331; E04B 1/2403; E04B 2001/34892; A62C 99/0081
USPC ........................................................ 434/226
See application file for complete search history.

(56) References Cited

U.S. PATENT DOCUMENTS

| 3,256,652 | A |   | 6/1966 | Lely |                      |
|-----------|---|---|--------|------|----------------------|
| 3,654,733 | A | * | 4/1972 | Blackwell | ................. E06B 7/32 |
|           |   |   |        |      | 49/168               |
| 3,683,100 | A | * | 8/1972 | Deal | ....................... H02G 3/00 |
|           |   |   |        |      | 174/491              |

(Continued)

FOREIGN PATENT DOCUMENTS

| JP | 2002097861 A | * | 4/2002 |
| JP | 2004137710 A | * | 5/2004 |
| JP | 2011097892 A | * | 5/2011 |

*Primary Examiner* — Adriana Figueroa
(74) *Attorney, Agent, or Firm* — Avek IP, LLC

(57) ABSTRACT

A modular building system, includes a building unit which is formed of a framing system, at least one door module, at least one window module, and wall panels. The framing system includes a floor, a ceiling, and four corner columns secured between the floor and the ceiling. The door module is temporarily secured between the floor and the ceiling along the perimeter of the framing system. Likewise, the window module is temporarily secured between the floor and the ceiling along the perimeter of the framing system. The wall panels are secured between the floor and the ceiling around the perimeter of the framing system to enclose the building. The door module and the window modules are interchangeable.

20 Claims, 10 Drawing Sheets

(56) References Cited

U.S. PATENT DOCUMENTS

| | | | | |
|---|---|---|---|---|
| 3,832,811 A * | 9/1974 | Briel, Jr. | | E04B 1/3445 |
| | | | | 52/69 |
| 3,985,174 A * | 10/1976 | Bricker | | E06B 7/32 |
| | | | | 160/180 |
| 4,620,404 A * | 11/1986 | Rizk | | E04B 1/3483 |
| | | | | 52/235 |
| 4,644,708 A * | 2/1987 | Baudot | | E04B 1/3483 |
| | | | | 52/123.1 |
| 4,854,094 A * | 8/1989 | Clark | | E04B 1/3483 |
| | | | | 52/234 |
| 4,891,919 A * | 1/1990 | Palibroda | | E04B 1/34321 |
| | | | | 52/79.5 |
| 4,910,932 A * | 3/1990 | Honigman | | E04B 1/08 |
| | | | | 52/280 |
| 5,203,707 A * | 4/1993 | Musto | | A62C 99/0081 |
| | | | | 434/226 |
| 5,381,633 A * | 1/1995 | Hendrich | | E04B 1/344 |
| | | | | 52/235 |
| 5,752,835 A * | 5/1998 | Whitmer, Sr. | | G09B 9/00 |
| | | | | 434/226 |
| 7,074,043 B1 * | 7/2006 | Jacobson | | A62C 99/0081 |
| | | | | 434/219 |
| 7,150,244 B2 * | 12/2006 | Dawes | | E06B 7/32 |
| | | | | 119/484 |
| 7,827,738 B2 * | 11/2010 | Abrams | | E04B 1/003 |
| | | | | 52/79.1 |
| 8,048,505 B1 * | 11/2011 | Reaney | | B32B 15/04 |
| | | | | 181/290 |
| 8,166,714 B2 | 5/2012 | Ziegelman | | |
| 8,186,110 B2 * | 5/2012 | Green | | E04B 1/24 |
| | | | | 52/79.9 |
| 8,276,328 B2 * | 10/2012 | Pepin | | E04B 1/3483 |
| | | | | 52/167.3 |
| 8,555,559 B2 * | 10/2013 | DiGregory | | E04B 1/3445 |
| | | | | 52/79.5 |
| 8,881,788 B1 * | 11/2014 | Spencer | | E06B 9/52 |
| | | | | 160/180 |
| 9,016,002 B2 * | 4/2015 | Segall | | G09B 9/003 |
| | | | | 52/79.5 |
| 9,109,356 B2 * | 8/2015 | Segall | | E04B 1/34315 |
| 9,121,168 B2 | 9/2015 | Levy et al. | | |
| 9,157,249 B2 * | 10/2015 | Segall | | E04H 1/1205 |
| D743,051 S * | 11/2015 | Swensson | | D25/48.5 |
| 2003/0198923 A1 * | 10/2003 | Westra | | E04H 3/00 |
| | | | | 434/226 |
| 2005/0279035 A1 * | 12/2005 | Donovan | | E04B 1/348 |
| | | | | 52/79.1 |
| 2007/0271857 A1 * | 11/2007 | Heather | | B65D 88/005 |
| | | | | 52/79.9 |
| 2009/0019811 A1 * | 1/2009 | Goldman | | E04B 1/34807 |
| | | | | 52/653.2 |
| 2013/0305629 A1 | 11/2013 | Stephenson et al. | | |
| 2015/0159363 A1 | 6/2015 | Ehsasi | | |
| 2016/0040443 A1 | 2/2016 | Stephenson et al. | | |

\* cited by examiner

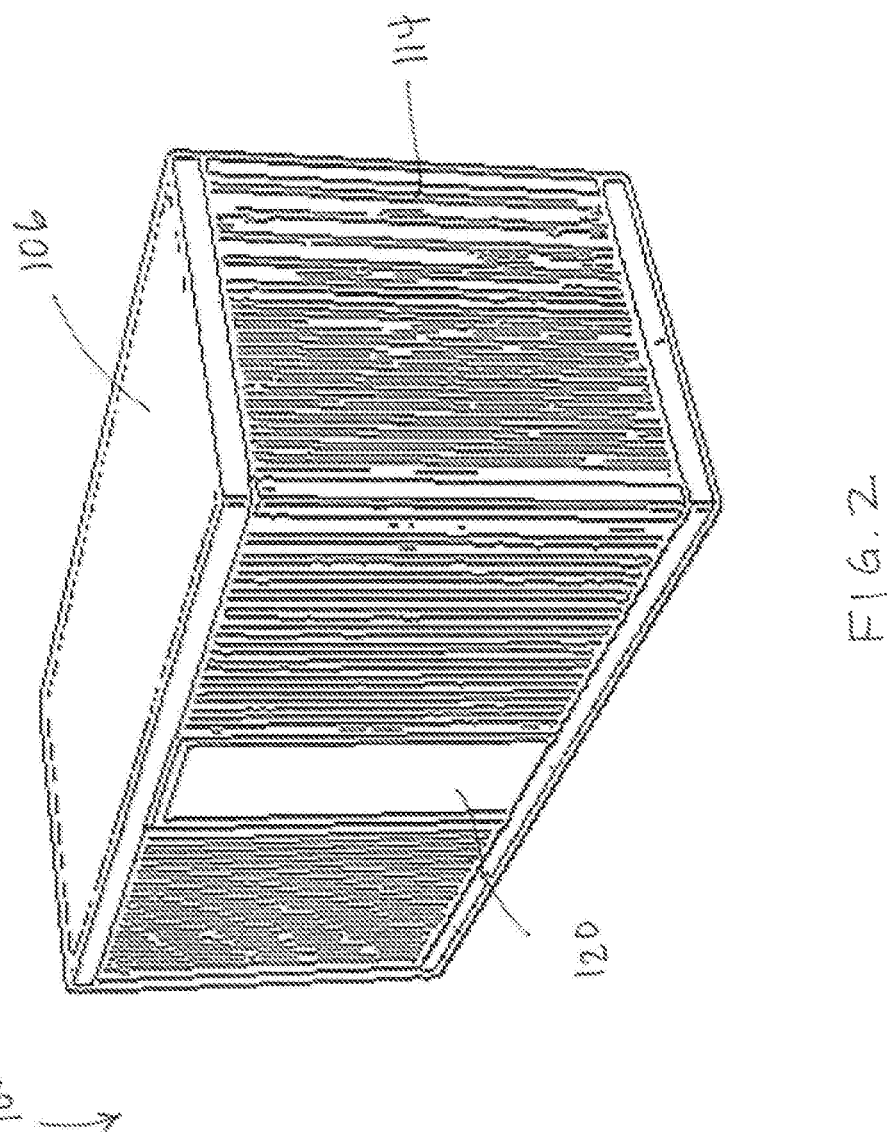

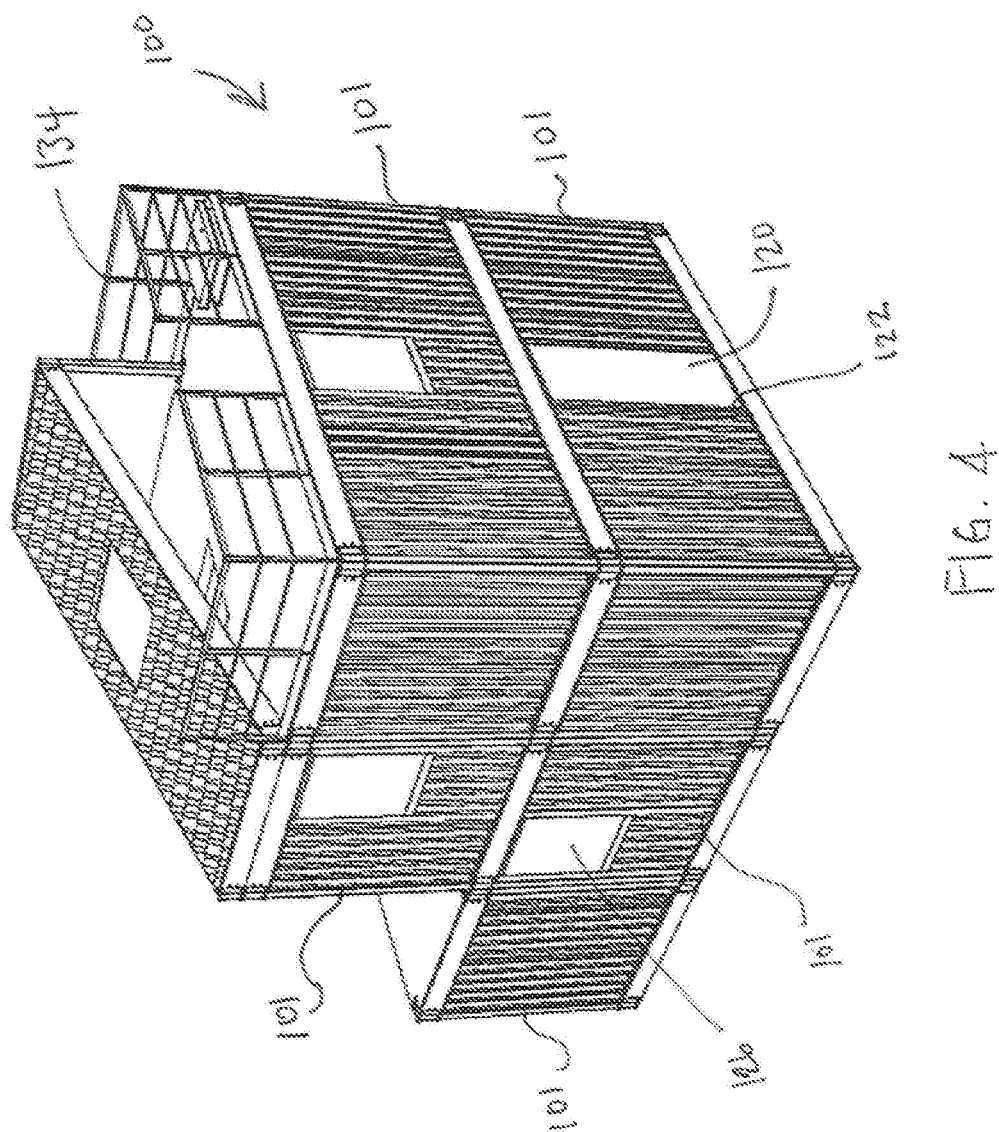

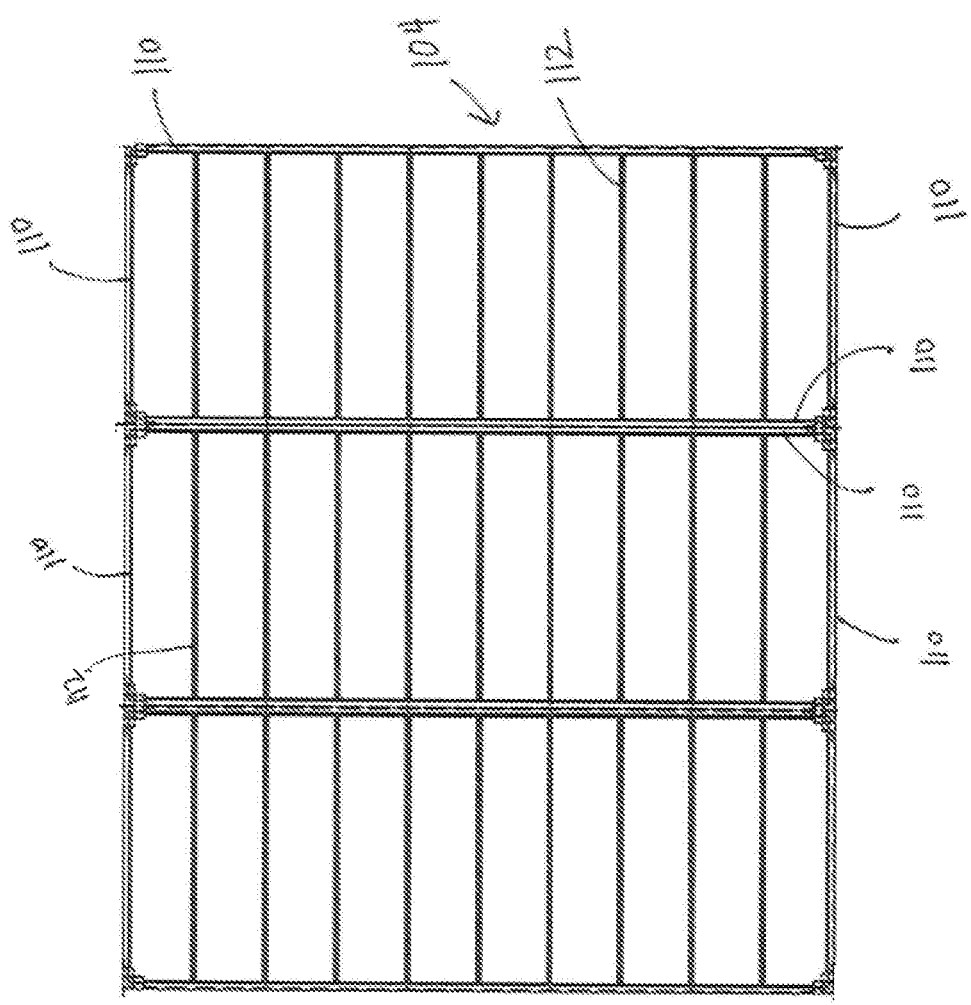

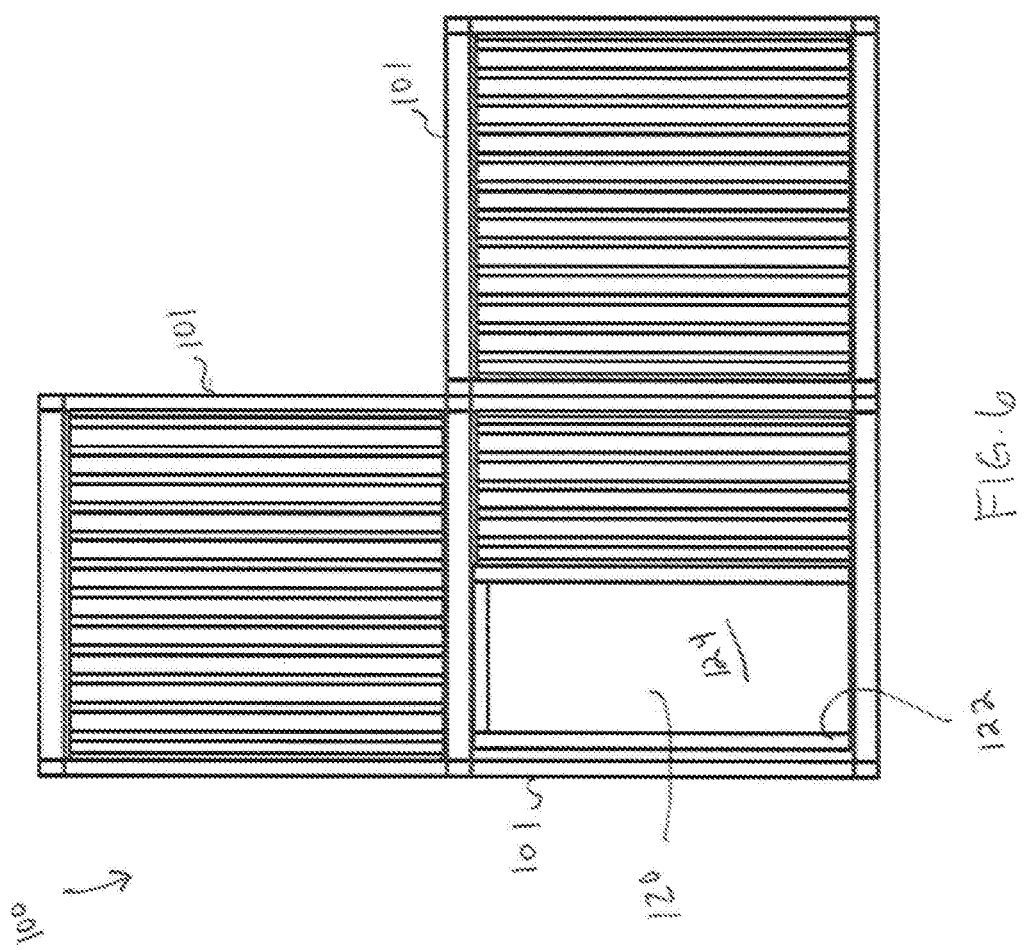

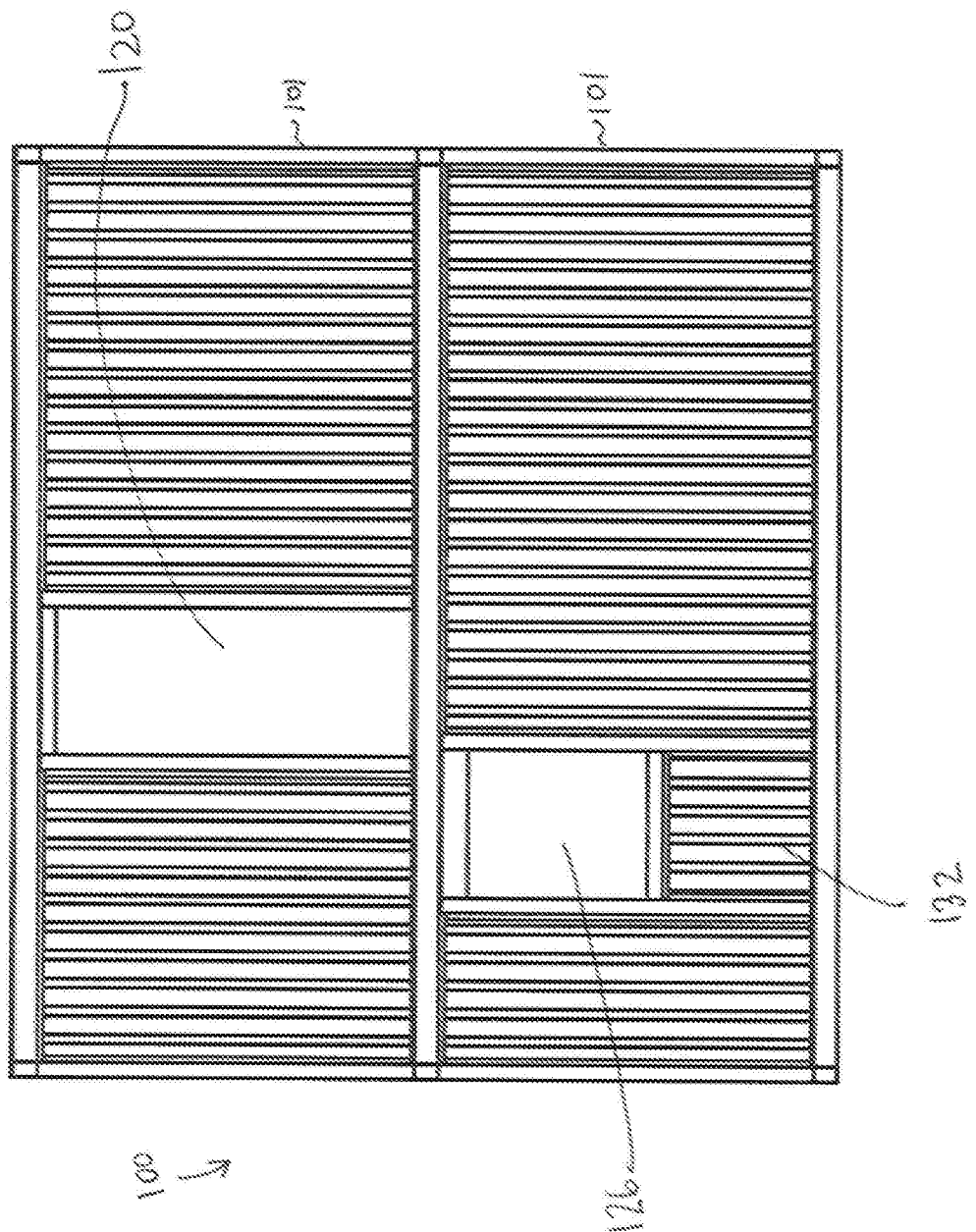

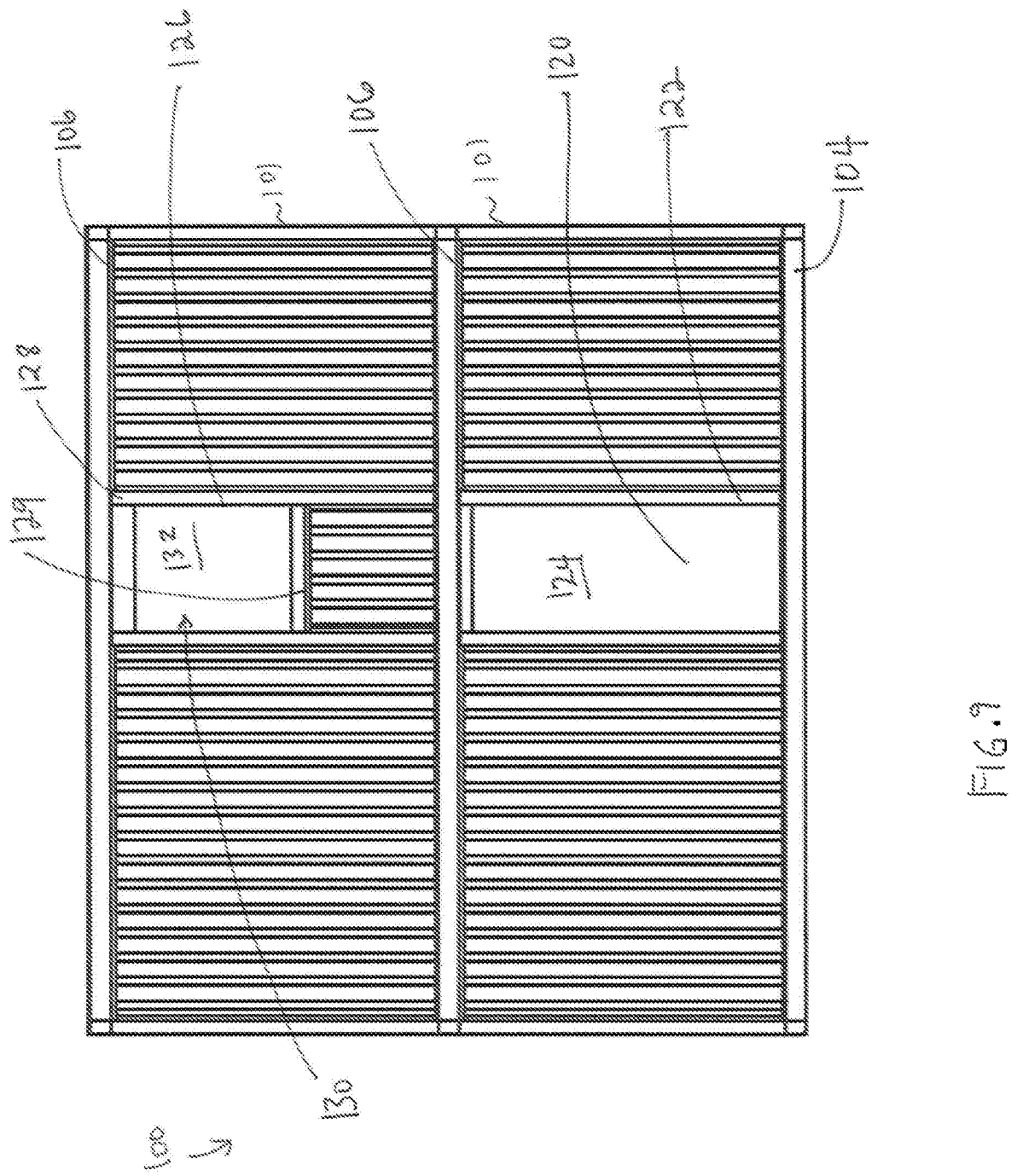

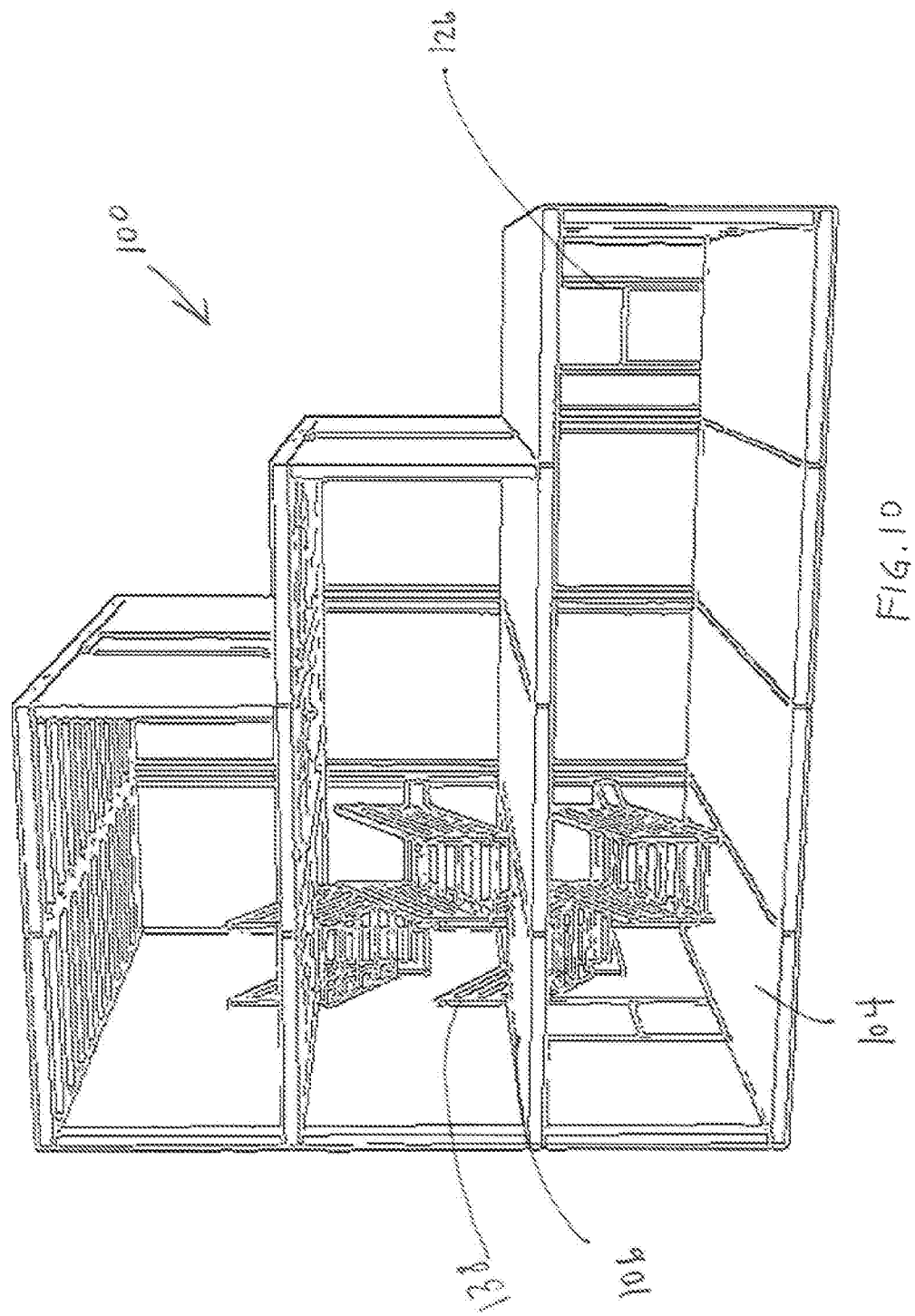

MODULAR BUILDING FIRE FIGHTING SIMULATOR

CROSS-REFERENCE TO RELATED APPLICATIONS

This application claims priority to U.S. Provisional Patent Application No. 62/409,476, filed Oct. 18, 2016, the entirety of which is incorporated by reference herein.

BACKGROUND

Public service employees, and especially emergency response persons such as police officers and firefighters, routinely undergo extensive training to prepare themselves to save life, property, and the environment during catastrophes. In particular, firefighters regularly practice the skills required to fight a fire. The National Fire Protection Association (NFPA) establishes training standards, and may review a skills program to ensure that it complies with the standards.

It is common for training to include the use of props so that the training more resembles what a firefighter may experience during a real fire. These props may include vessels designed to resemble those that may be encountered in real life, ranging from small containers (e.g., trash cans) to full-size buildings. Clearly, simulating a fire-fighting experience in a full-size building can be difficult, as it is expensive and time consuming to build and subsequently destroy a building. Accordingly, shipping containers are traditionally used for fire training simulations. However, these containers are not customizable, and are not designed to provide alternative situations to the training fire fighters. In other words, the configuration of the "building" remains constant. Therefore, once a fire fighter has experienced the simulation, he is less likely to appreciate the simulation on later occasions because he can anticipate the intricacies of the scenarios (e.g., locations of windows, doors, stair cases, etc.). Accordingly, a modular fire-fighting building simulator is desirable, where various components of the building may be moved around to provide the fire fighters with a number of different training scenarios.

SUMMARY

The following presents a simplified summary of the invention in order to provide a basic understanding of some aspects of the invention. The summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In one embodiment, a modular building system, includes a building unit which is formed of a framing system, at least one door module, at least one window module, and wall panels. The framing system includes a floor, a ceiling, and four corner columns secured between the floor and the ceiling. The door module is temporarily secured between the floor and the ceiling along the perimeter of the framing system. Likewise, the window module is temporarily secured between the floor and the ceiling along the perimeter of the framing system. The wall panels are temporarily secured between the floor and the ceiling around the perimeter of the framing system to enclose the building. The door, window, and wall modules are interchangeable.

In another embodiment, a modular building system comprises a framing system, a door module, a widow module, and wall panels. The framing system includes a floor, a ceiling, and corner columns. The floor is formed from a plurality of girders arranged to form a border and a plurality of support members secured therebetween. Likewise, the ceiling is formed from a plurality of girders arranged to form a border and a plurality of support members secured therebetween. The four corner columns are secured at the corners between the floor and the ceiling. The door module is temporarily secured between the floor and the ceiling along the perimeter of the framing system. The window module is also temporarily secured between the floor and the ceiling along the perimeter of the framing system. The wall panels are temporarily secured between the floor and the ceiling around the perimeter of the framing system to enclose the building. The door, window, and wall modules are interchangeable.

BRIEF DESCRIPTION OF DRAWINGS

FIG. 2 shows a perspective view of the modular building according to FIG. 1.

FIG. 4 shows a top perspective view of a modular building according to another embodiment of the invention.

FIG. 5 shows an exemplary floor plan with support members of a modular building according to yet another embodiment of the invention.

FIG. 6 is a side view of the building of FIG. 5.

FIG. 7 is a front view of the building of FIG. 5.

FIG. 9 is a rear view of the building of FIG. 5.

FIG. 10 shows an inside view of a building having a built-in modular stair case, in accordance with an embodiment of the invention.

DETAILED DESCRIPTION

Traditionally, shipping containers were used for fire training facilities, and were configured to be mobile or fixed. If mobile, the container may be disposed on the back of a trailer so that it may be transported as necessary. Fixed shipping containers are nearly identical to their mobile counterparts, but are placed in a fixed location. Multiple containers can be stacked on top of one another, and by manipulating the containers, it may be possible to create rooms and hallways. However, the extent to which the training facility can be customized is severely limited. This is especially true because the containers are not designed to have sections removed, and doing so requires that the containers be supported by interior columns, beams, or additional walls.

Disclosed herein are embodiments of modular training buildings that may be reconfigured to provide multiple training simulation experiences. In embodiments, and as will be described in greater detail below, the modular training buildings are designed to be combined (e.g., stackable) to create a taller structure, and may be customizable based on a user's requirements.

Figure 1:
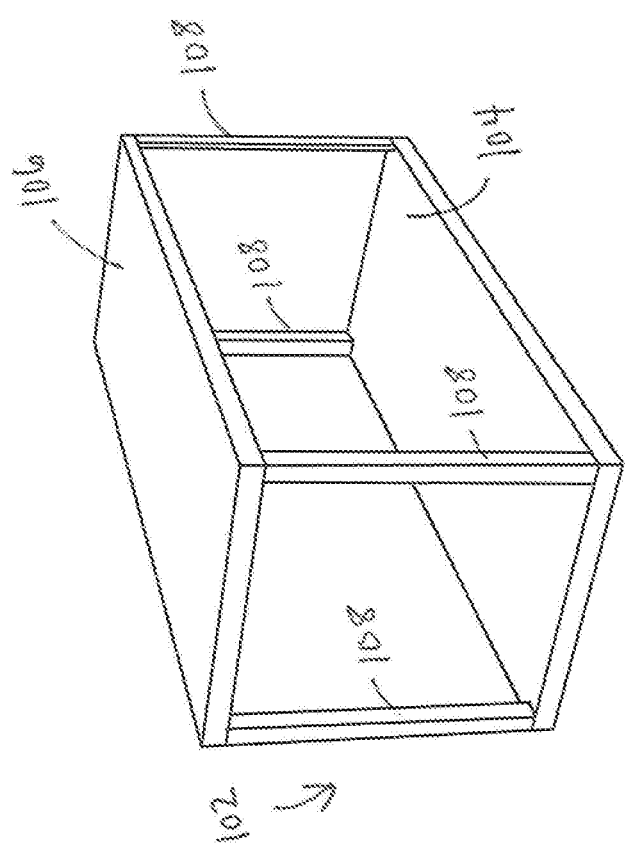
FIG. 1 shows a perspective view of a framing system of a modular building according to an embodiment of the invention.

With reference now to the figures, FIG. 1 shows a framing system 102 forming the structural component of a modular fire simulator building 100 according to an embodiment of the invention. Each building 100 has at least one unit 101, which includes framing system 102 has a floor 104, a ceiling 106, and four corner columns 108. Structural steel girders 110 may form a perimeter defining the area of the floor 104 (FIG. 5). The floor surface 104 may be comprised of structural concrete rigid boards, which may be supported on structural C-channels 112 coupled to the girders 110 at the ends. In embodiments, the C-channels 112 are mounted at 24" on center, although this is not a requirement, and the C-channels 112 may be mounted at any interval that provides the necessary support for the floor panels. The C-channels 112 may be mounted to the girders 110 via mechanical fasteners (e.g., bolts) or via welding or any other appropriate fastening means. Optionally, weeps may be provided in the bottom of the C-channels 112 to allow moisture to drain out of the channels 112.

In embodiments, the ceiling 106 is identical to the floor 104. Preferably, in embodiments where two or more modules 100 are stacked atop one another, the ceiling 106 of a lower module also serves as the floor 104 of an upper module. This may allow for easier assembly of the module.

The corner columns 108 may be, for example, minimum ¼" tube steel. Each corner column 108 may be equipped with flanges that may be pre-punched or pre-drilled for attachment to the floor or ceiling, as the case may be. The flanges may be formed as a unitary part of the column 108, or may be welded to and/or otherwise attach to the column 108 (e.g., via mechanical fasteners). The columns 108 are secured to the floor 104 and/or ceiling 106 using traditional mechanical fasteners.

Accordingly, to form the framing system 102, the columns 108 are secured at the corners to the floor 104. The ceiling panel 106 may then be positioned atop the columns 108 and secured thereto. Importantly, and in contrast with units currently available on the market, each framing system 102 is structurally engineered, based on local code requirements, to stand-alone without the need for additional structural modifications such as columns, walls, etc. Accordingly, once the columns 108 and the floor 104 and ceiling 106 are secured together in accordance with the local code, the building 100 is structurally sound. As is described in greater detail below, walls and entry and exit elements may be added along the perimeter of the framing system 102 to complete the building.

Each building 100 may be customized based on the local code requirements of the location of the building. A structural engineer may be engaged to customize the design of each building 100, taking into consideration the various code requirements. Each owner may receive a customized set of blueprints that are signed and sealed by the engineer certifying that the building is structurally sound.

Figure 3B:
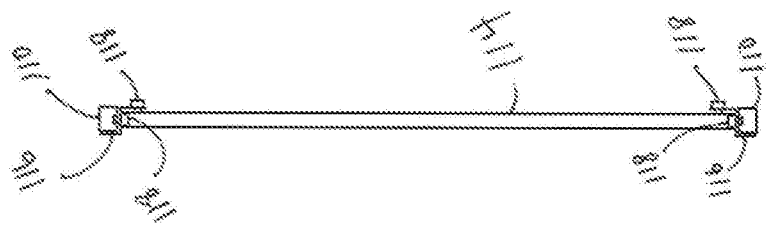
FIG. 3B shows a side view of the section of the wall of the modular building according to FIG. 1.
Figure 3A:
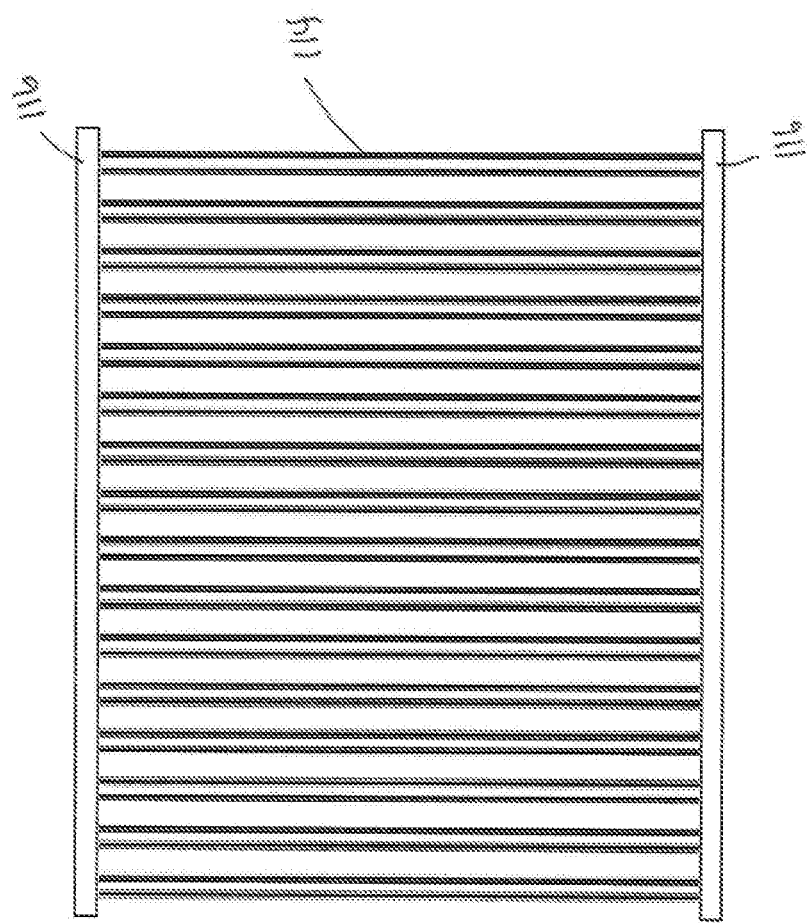
FIG. 3A shows a front view of a section of a wall of the modular building according to FIG. 1.

Once the framing system 102 is assembled, walls 114 may be attached around the perimeter of the building 100. The walls 114 may be structural steel walls, and, in embodiments, may be a minimum 18 gauge galvanized sheet metal. Other materials or material specifications may be substituted for the 18 gauge galvanized sheet metal, as appropriate. The sheets may be roll-formed from flat steel and attached together per manufacturer specifications. The edges of the walls 114 may be trimmed with channels 116 which allow for attachment to the floor 104 and/or ceiling 106 (FIGS. 3A and 3B). The walls may be secured to the channels 116 via mechanical fasteners 118 such as bolts or rivets, and the channels may likewise be attached to the floor 104 (or ceiling 106, as the case may be) via the steel girders 110.

The configuration of the wall panels 114 may depend on the various access portals or openings designed to be incorporated therein. The openings may include one or more doors and/or windows, and as will be described in greater detail below, the location of the doors, windows, and walls may be customized based on a user's specifications. The doors and windows (and walls 114) may be designed such that they may be easily interchanged, exchanged, and replaced. Each of the door and window modules may be premanufactured according to a user's specifications for placement at the user's desired location. However, because the user may desire to use the building 100 for multiple training sessions, the door and window modules, as well as the walls, may be reconfigured such that trainees experience a new training scenario each time.

The door module 120 (shown in FIGS. 2, 4, 6, 7, and 9) may include a frame 122 and a door panel 124. The frame 122 may be a fully welded tubular assembly, and in embodiments, the tubular assembly may be fabricated of tubular steel which is hot-dipped galvanized. The door panel 124 may be fabricated from commercial quality steel, such as 11 gauge steel. Preferably, the perimeter of the door panel 124 is reinforced with a continuous steel channel. The channel may be welded to the door panel 124. The door panel 124 may be equipped with an operating lever latch having handles on the inside and the outside of the door. Any doors which may be located at the ground level may include a key lock lever, and preferably, all doors on the ground level would be keyed alike. The door panel 124 may be in hinged connection with the frame 122, and may stitch welded to the door panel 124 and preassembled as part of the door module 120. Optionally, the frame opening may be equipped with a drip lip header.

The door frame 122 may be substantially the same height as the distance between the floor 103 and the ceiling 105 such that the frame 122 may fit therebetween. The door frame 122 may be further equipped with flanges which may be preassembled as part of the frame 122 such that the frame 122 may be bolted to the floor 104.

Figure 8:
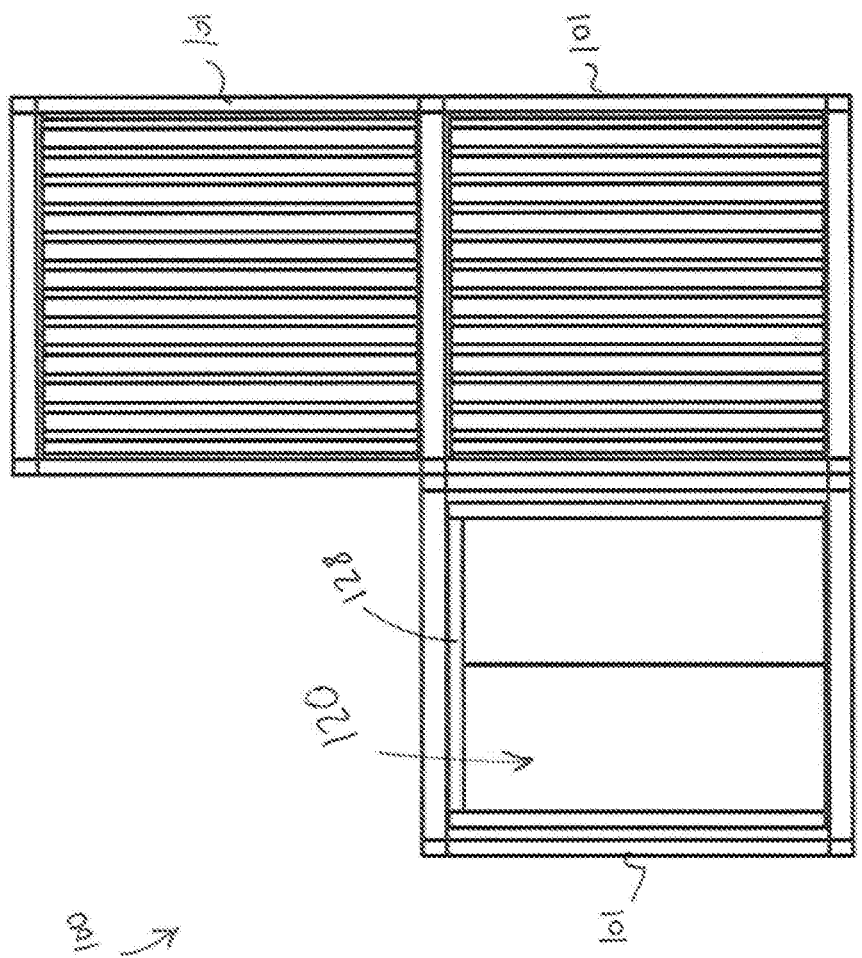
FIG. 8 is a side view of the building of FIG. 5.

In embodiments, the door module 120 may include a frame 128 may be configured to support two French-style doors, for example as shown in FIG. 8.

Similarly, the window modules 126 (shown in FIGS. 7 and 9) may include a frame 128 which may be a fully welded tubular assembly. The assembly may be fabricated from any appropriate material, and in one embodiment, it is fabricated from 3/16" steel which is hot-dipped galvanized. The frame 128 may include an intermediate horizontal member 129 which may define a shutter frame 130 into which a window panel 130 is received. The window panel 130 may have a recessed lip perimeter which engages with the frame 128 to act as a stop and prevent entry of the elements into the building 100. The window panel 130 may be hingedly connected to the frame 128. In an embodiment, a hinge is provided along one side of the window, and a corresponding lip is fastened to the frame 128 with mechanical fasteners. Optionally, the framed opening 128 may be provided with a drip lip header.

The window panel 130 further includes an operating lever latch with handles on the inside and the outside of the window. Any window units 126 which may be located at the ground level may have a key lock lever, and preferably, all window units 126 on the ground level are keyed alike.

A wall panel 114 may be disposed in the space below the window panel 130 (designated by reference numeral 132 in FIG. 7). In embodiments, the wall panel 114 may be equipped with a hinge which may be welded to a section of the channel 116 surrounding the wall panel 114 (e.g., the section of the channel 116 at the top of the wall panel 114). This may allow for the wall panel section 132 to rotate into an open position, if desired, for example, to allow water to flow out of the building. In another embodiment, the wall panel section 132 is stationary.

The window frame 128 may be substantially the same height as the distance between the floor 103 and the ceiling 105 such that the frame 128 may fit therebetween. The window frame 128 may be further equipped with flanges which may be preassembled as part of the frame 128 such that the frame 128 may be bolted to the floor 104.

Once the door module(s) 120 and/or window modules 126 are placed in position and secured along the perimeter of the frame 102, the wall panels 114 may be placed into position and secured to the frame 102.

Since the door modules 120, window modules 126, and walls 114 are premanufactured and assembled, and are temporarily attached to the frame 102, the door modules 120, window modules 126, and walls 114 are interchangeable. To change the location of the door module 120, for example, it may be simply unfastened from the frame 102 and moved to a new location (e.g., the previous location of the window module 126). Alternately, it may be swapped with a wall panel section 114. Accordingly, the building 100 may be easily reconfigured to accommodate different training scenarios. It shall also be understood that the wall panels 114 may additionally be reconfigurable, as the panels 114 are also only temporarily secured to the frame 102. The building 100 may thus take any of a number of different configurations based on the locations of any door and/or window modules 120 and 126 and the walls 114.

In embodiments, door and/or window modules 120 and 126 may be located on upper units 101, which may allow users to exit the building 100 above ground level. In order to comply with OSHA requirements, a rail assembly 134 (FIG. 4) may be provided along the perimeter to prevent users from falling over the edge. The railings may be fabricated from steel tubing and are preferably designed to comply with all OSHA requirements, as well as any additional local requirements that may exist. The posts of the rail assembly 134 may be welded to toe boards, which may be bolted to the structural C-channels 112 in the floor 104. Optionally, the rails may be in hinged connection with the respective floor 104 such that the railing assembly 134 can be rotated into a lowered position (e.g., during transport) and then rotated into the raised position when the building 100 reaches its destination. Means (e.g., locks, mechanical fasteners, and the like) for keeping the railing assembly in the raised position may be provided.

As is clear from the description provided herein, multiple units may be easily connected together to form a larger building, as shown in FIGS. 3-10. Here, the building includes multiple modular units 101 connected together to form a building 100. As noted herein, because the frame system 102 solely provides the structural support for the unit independent of the walls, two or more units may be secured together to extend the horizontal profile of the building 100 by simply lining up the units 101 with the appropriate exterior walls (e.g., two or three exterior walls, depending on the position of the unit 101), and securing the units together with connecting bolts according to methods known to those of skill in the art. Vertical height may be achieved by using the ceiling 106 of one unit 101 as the floor 104 of a second unit, the columns 108 of the second unit being secured to the floor 104 as described here to form the frame 102. Therefore, it shall be understood that the building 100 can include as many units 101 as is desirable. Further, additional units 101 may be added onto the building 100 at any time very easily.

All seams, including vertical wall module seams, may be sealed using a continuous strip of sealer or caulking. Preferably, the sealer used is such that it does not run, separate, or deteriorate with age. The building unit shall thus be weather resistant. To reconfigure the door, window, and/or wall modules 120, 126, and/or 114, the seal may be broken, e.g., using a sharp tool. Once the seal is broken, the door, window, and/or wall modules 120, 126 and/or 114 can be detached from the floor 104 and reconfigured as described herein. Once the reconfiguration is complete, the sealer or caulking may be replaced with new sealer or caulking, again providing weather resistance to the building 100. In an embodiment, the seals are formed of single-side PVC (polyvinyl chloride) foam. Here, when door, window, or wall modules 120, 126, and/or 114 are moved from one location to another, the seal may be substantially maintained and therefore may not require replacement.

In addition to customizing the configuration of the exterior walls, the interior of the building may also be customized. Stair assemblies 138 (shown in FIG. 10) may be pre-manufactured for inclusion as part of the building. The stairs 138 may include one or more flights with a landing in between. A section of the floor 104 of the upper unit 101 may be removed to accommodate the stair assembly 138. Again, the structural support for the building 100 comes from the frame 102 allows for such customization of the interior with the stair assemblies 138—the stair assembly 138 may be placed anywhere that is desirable for the user. The stair assembly 138 may be premanufactured such that the posts may be secured to the floor 104 via mechanical fasteners, and the landing may additionally be secured to the respective columns 108.

Optionally, interior walls may be included to further customize the building 100. The interior walls may not be load bearing, and may be easily removed, or moved, to accommodate the requirements of the owner.

Further, because the building is designed such that the framing system provides the structural support for the building, and therefore additional support structures are not required, it may be possible to include a burn room strategically located anywhere inside the building. As is known to those of skill in the art, a burn room is an area within the building in which a fire event may be started for training purposes. The burn room may include high temperature insulating panels and attachment materials. The burn room may include a floor, ceiling, and insulating wall panels fastened together according to methods known to those in the art. The floor, ceiling and wall panels may be pre-treated with a chemical system that transforms to the panels to be water resistant or repellant. The panels may be configured to allow for live fires in temperature ranges up to at least 1200 degrees Fahrenheit. In embodiments, the panels may be manufactured from Super Padgenite HD™, a UL listed liner that works with Class A or gas simulators, which was designed specifically for the fire service industry. However, other materials may alternately be used.

Any doors which may be formed into the burn unit may be equipped with spring closures and catches to bring the door into the closed position. Any doors which may be accessible from the ground level may include a slide bolt to lock the door. Any window panels which may be formed into the burn unit may include an operating lever latch.

The building components, whether or not exposed to the elements, may be manufactured from a structural steel or other appropriately strong material. The steel may be hot-dipped galvanized to provide a low-maintenance finish. The exterior walls may be painted such that the building is aesthetically pleasing to onlookers. The paint may be siliconized polyester which may be oven-cured to ensure long-lasting color. The doors and windows may additionally be painted. Here, the paint may be an aliphatic urethane, applied according to manufacturer's standard procedures.

The modular building system may be shipped flat packed and assembled on-site, or may alternately be shipped fully assembled.

Many different arrangements of the described invention are possible without departing from the spirit and scope of the invention. Embodiments of the invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the invention.

Further, it will be understood that certain features and subcombinations are of utility and may be employed without reference to other features and subcombinations, and are contemplated within the scope of the claims. Not all steps listed in the various figures and description need to be carried out in the specific order described. The description should not be restricted to the specific described embodiments.

The invention claimed is:

1. A modular building system, comprising a first building unit, the first building unit comprising:
    a structural framing system consisting essentially of a floor, a ceiling, and four corner columns secured between the floor and the ceiling;
    at least one door removably secured between the floor and the ceiling at a first door location along a perimeter of the structural framing system;
    at least one window removably secured between the floor and the ceiling at a first window location along the perimeter of the structural framing system; and
    wall panels removably secured between the floor and the ceiling around the perimeter of the structural framing system to enclose the building;
    wherein:
    the door and the window are each selectively relocatable to a respective second location along the perimeter of the structural framing system;
    the door consists of a frame and a door panel, the frame comprising parallel vertical members sized to extend between the floor and the ceiling and a header disposed between the parallel vertical members; the door panel being operably connected to one of the vertical members; wherein the door is configured as a standalone unit; and
    the window consists of a frame comprising parallel vertical members sized to extend between the floor and the ceiling, a header disposed between the parallel vertical members, and an intermediate member disposed between the parallel vertical members parallel to the header, the window thus defining first and second stacked openings;
    wherein a window panel is disposed in the first stacked opening and a wall panel is hingedly disposed in the second stacked opening; wherein the window is configured as a standalone unit.

2. The modular building system of claim 1, wherein the floor comprises a plurality of girders arranged to form a border, and a plurality of C-channels disposed between the girders, and wherein floor panels are disposed above the C-channels and secured thereto.

3. The modular building system of claim 2, wherein the ceiling comprises a plurality of girders arranged to form a border, and a plurality of C-channels disposed between the girders, and wherein ceiling panels are disposed above the C-channels and secured thereto.

4. The modular building system of claim 1, comprising the first building unit and a second building unit, wherein each building unit comprises wall panels disposed around the perimeter of three continuous sides, and wherein the building units are brought together to form a single enclosed building, the building units being secured together using connecting bolts.

5. The modular building system of claim 4, further comprising a third building unit, the third building unit comprising:
    a third structural framing system comprising a third ceiling and four corner columns secured between the third ceiling and the first ceiling;
    a third door temporarily secured between the third ceiling and the first ceiling;
    a third window temporarily secured between the third ceiling and the first ceiling; and
    a third set of wall panels temporarily secured between the third ceiling and the first ceiling around a perimeter of the third structural framing system to enclose the building;
    wherein the third door, the third window, and the third set of wall panels are reconfigurable; and
    wherein the ceiling of the first building unit forms the floor of the third building unit, and wherein an opening is formed in the ceiling of the first building unit to accommodate a stair assembly.

6. The modular building system of claim 5, further comprising a rail assembly disposed atop an open perimeter of the second building unit, the rail assembly being hingedly coupled to the open perimeter.

7. The modular building system of claim 1, comprising a second building unit, the second building unit comprising:
    a second structural framing system comprising a second ceiling and four corner columns secured between the second ceiling and the first ceiling;
    a second door temporarily secured between the second ceiling and the first ceiling;
    a second window temporarily secured between the second ceiling and the first ceiling; and
    a second set of wall panels temporarily secured between the second ceiling and the first ceiling around a perimeter of the second structural framing system to enclose the building;
    wherein the second door, the second window, and the second set of wall panels are reconfigurable; and
    wherein the ceiling of the first building unit forms the floor of the second building unit.

8. The modular building system of claim 7, wherein an opening is formed in the ceiling of the first building unit to accommodate a stair assembly.

9. The modular building system of claim 1, wherein the wall panels are disposed around the perimeter of the structural framing system between the door and the window.

10. The modular building system of claim 1, further comprising an interior wall removably secured between the floor and the ceiling.

11. The modular building system of claim 1, further comprising a burn room disposed within the building, the burn room comprising a plurality of insulating panels that are configured to withstand 1,200° F.

12. A modular building system, comprising a building unit, the building unit comprising:
- a structural framing system consisting essentially of a floor, comprising a plurality of girders arranged to form a border and a plurality of support members secured therebetween; a ceiling, comprising a plurality of girders arranged to form a border and a plurality of support members secured therebetween; and four corner columns secured at the corners between the floor and the ceiling;
- a door removably secured between the floor and the ceiling at a first location along a perimeter of the structural framing system; the door having a first continuous channel along a perimeter;
- a window removably secured between the floor and the ceiling at a first location the perimeter of the structural framing system; the window having a second continuous channel along a perimeter; and
- wall panels removably secured between the floor and the ceiling around the perimeter of the structural framing system to enclose the building;

wherein:
- the door and the window are each selectively relocatable to a respective second location along the perimeter of the structural framing system;
- the door consists of a frame and a door panel, the frame comprising parallel vertical members sized to extend between the floor and the ceiling and a header disposed between the parallel vertical members; the door panel being operably connected to one of the vertical frame members; wherein the door is configured as a stand-alone unit; and
- the window comprising a frame comprising parallel vertical members sized to extend between the floor and the ceiling, a header disposed between the parallel vertical members, and an intermediate member disposed between the parallel vertical members parallel to the header, the window thus defining first and second stacked openings;
- wherein a window panel is disposed in the first stacked opening and a wall panel hingedly disposed in the second stacked opening;
- wherein the window is configured as a standalone unit.

13. The modular building system of claim 12, wherein the wall panels are constructed of sheet metal, and are trimmed with channels for attachment to the floor and ceiling.

14. The modular building system of claim 12, wherein the door and the window are removably secured to the floor and the ceiling using mechanical fasteners.

15. The modular building system of claim 14, wherein voids formed between the door, the window, and the wall panels are sealed such that the building unit is weather resistant.

16. The modular building system of claim 12, wherein the door, the window, and the wall panels are pre-manufactured and pre-assembled prior to engagement with the structural framing system.

17. A modular building system, comprising a building unit, comprising:
- a framing system comprising a floor, a ceiling, and four corner columns secured between the floor and the ceiling;
- a door module temporarily secured between the floor and the ceiling along a perimeter of the framing system;
- a window module temporarily secured between the floor and the ceiling along the perimeter of the framing system, the window module comprising a frame with parallel vertical members sized to extend between the floor and the ceiling, a header disposed between the parallel vertical members, and an intermediate member disposed between the parallel vertical members parallel to the header, the window module thus defining first and second stacked openings;
- a window disposed in the first stacked opening and a movable panel hingedly disposed in the second stacked opening; and
- a wall panel temporarily secured between the floor and the ceiling at the perimeter of the framing system;
- wherein the door module, the window module, and the wall panel are selectively relocatable.

18. The modular building system of claim 17, wherein the framing system provides full structural support for the modular building.

19. The modular building system of claim 17, wherein the floor comprises a plurality of girders arranged to form a border, and a plurality of C-channels disposed between the girders, and wherein floor panels are disposed above the C-channels and secured thereto.

20. The modular building system of claim 17, wherein the ceiling comprises a plurality of girders arranged to form a border, and a plurality of C-channels disposed between the girders, and wherein floor panels are disposed above the C-channels and secured thereto.

* * * * *